US008732293B2

(12) United States Patent
McDaniel et al.

(10) Patent No.: US 8,732,293 B2
(45) Date of Patent: May 20, 2014

(54) SYSTEM AND METHOD FOR TRACKING INDIVIDUALS ON A DATA NETWORK USING COMMUNITIES OF INTEREST (75) Inventors: Patrick McDaniel, State College, PA (US); Subhabrata Sen, New Providence, NJ (US); Oliver Spatschek, Morris, NJ (US); Jacobus E. Van de Merwe, Union, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1706 days.

(21) Appl. No.: 11/275,083

(22) Filed: Dec. 8, 2005

(65) Prior Publication Data
US 2010/0198959 A1    Aug. 5, 2010

Related U.S. Application Data (60) Provisional application No. 60/652,986, filed on Feb. 15, 2005.

(51) Int. Cl.
*G06F 15/173* (2006.01)
*G06F 11/00* (2006.01)

(52) U.S. Cl.
USPC .......................................... 709/224; 726/22

(58) Field of Classification Search
USPC .......................................... 709/224; 726/22
See application file for complete search history.

(56) References Cited

U.S. PATENT DOCUMENTS

| 2002/0032717 A1* | 3/2002 | Malan et al. ................... 709/105 |
| 2003/0097439 A1* | 5/2003 | Strayer et al. ................. 709/224 |
| 2004/0199576 A1* | 10/2004 | Tan ................................ 709/203 |
| 2004/0221191 A1* | 11/2004 | Porras et al. ...................... 714/4 |

OTHER PUBLICATIONS

European Search Report dated May 25, 2006 in European Application No. 06101386.8-2416.
European Examination Report dated Oct. 15, 2008 in European Application No. 06101386.8-2416.
Canadian Examination Report dated Oct. 30, 2008 in Canadian Application No. 2,535,187.

* cited by examiner

Primary Examiner — Jerry Dennison
Assistant Examiner — Adam Cooney
(74) Attorney, Agent, or Firm — Hartman & Citrin LLC (57) ABSTRACT The current invention relates to a system and method for tracking or locating a target entity on a data network, such as the public Internet, by analyzing network traffic and communication among interacting network nodes. The invention describes a system of creating an information set of data related to the traffic patterns associated with a specific entity over a time period, and comparing the information set to other information related to the traffic patterns associated with a group of entities over the same time period. By excluding information that is common to both the specific entity and the group of entities from the information set, the information set is left with only the information that helps identify the specific entity on the network.

6 Claims, 8 Drawing Sheets

| Block 610 | Block 630 | Block 650 | Block 670 |
|---|---|---|---|
| Bob's IP address — 612 | Bob's IP address | Bob's IP address | Bob's IP address |
| Search Engine's IP address — 614 | News Website's IP address | E-mail Server's IP address | Midwest Fishing Website's IP address |
| Bob's IP port — 616 | Bob's IP port | Bob's IP port | Bob's IP port |
| Search Engine's IP port — 618 | News Website's IP port | E-mail Server's IP port | Midwest Fishing Website's IP port |
| Protocol # — 619 | Protocol # | Protocol # | Protocol # |

| Block 620 | Block 640 | Block 660 | Block 680 |
|---|---|---|---|
| Search Engine's IP address | News Website's IP address | E-mail Server's IP address | Midwest Fishing Website's IP address |
| Bob's IP address | Bob's IP address | Bob's IP address | Bob's IP address |
| Search Engine's IP port | News Website's IP port | E-Mail Server's IP port | Search Engine's IP port |
| Bob's IP port | Bob's IP port | Bob's IP port | Bob's IP port |
| Protocol # | Protocol # | Protocol # | Protocol # |

SYSTEM AND METHOD FOR TRACKING INDIVIDUALS ON A DATA NETWORK USING COMMUNITIES OF INTEREST

RELATED APPLICATIONS

This application claims priority to provisional application Ser. No. 60/652,986, which was filed on Feb. 15, 2005 and is incorporated by reference in its entirety herein.

FIELD OF THE INVENTION

This invention relates to a system and method for tracking individuals on a data network by analysis of network traffic patterns. More specifically, the invention describes the use of communities of interest to identify an individual by specific network traffic signature.

BACKGROUND OF THE INVENTION

Data networks are growing in size and complexity. A prime example is the public Internet, which has millions of nodes connected to it across the world. Enterprise networks can also be very large and complex. For example, corporate networks sometimes connect thousands of nodes, and carry multiple types of network traffic, such as IP traffic, Novell IPX traffic, or IBM SNA traffic.

With the complexity and size of data networks, as well as the number of network protocols in use, it can be hard to find or identify a specific entity on a network. Through the use of dynamic addressing protocols such as DHCP and network address translation implementations, an individual may log on to the same network and be given a different network address at each log-in, whether or not the individual is mobile. Effectively, an individual may remain anonymous to network administrators or others that may be trying to locate them. With DHCP, IP addresses are dynamically assigned so that networks can utilize a smaller range of IP addresses. For example, most broadband providers only issue 3-day DHCP leases to their customers, which means that after 3 days a new customer and it's computer might utilize the same IP address, only having those IP addresses tied up which are actually in use on the network.

Even if an individual computer has a static IP address from a particular Internet service provider on the Internet, when that individual changes its Internet service provider, the computer is typically assigned a new IP address, and the computer may enter the network in a completely different location or from a new address space. Another complication is that multiple individuals may use the same machine, such as at a University computer lab or at an Internet Café.

Thus, a network address associated with a single machine may not identify a specific individual, especially in the context of the public Internet. There is a need for another way to identify individuals, other than by a specific network address, like an IP address, or MAC address.

In the context of a telephone network, a similar problem has been addressed by using communities of interest (COIs) to track the specific telephone communications of an individual and to identify a specific individual. In the telecommunications industry, there are many types of fraudulent behavior that have made it beneficial to be able to track and identify fraudulent actors. For example, telephone companies have been able to identify individuals signing up for telephone service with stolen credit cards. By comparing the communication pattern of a previously caught fraudulent actor to a current suspected fraudulent actor, it is easier to make a determination that the person with the same or a similar communication pattern is using a stolen credit card as well. The same example applies to individuals that are not paying their bills for telephone service. If a person's telephone service is cancelled due to delinquent bill payment, and the person then registers for telephone service under a new or false name, it is very likely that the individual's calling pattern would remain the same, and make the person easily identifiable.

The known method of using COIs to track individuals in a telephone network, however, is not readily transferable to a data network. First, telephone networks and data networks typically have distinct underlying technological approaches: a telephone network is usually a circuit switched network, while a data network is usually a packet switched network. In addition, the amount and type of data that is available in a telephone network is related to one application and thus very limited and relatively easy for a telephone service provider to collect. A data network, on the other hand, is much more complex and typically carries multiple types of applications, making information inherently more difficult to track. It can be even more difficult to make use of data gathered from a data network because there is a large amount of additional unusable data exchanged in a single network transaction that does not necessarily represent communication.

Thus, there is a need for a system and method of tracking individuals or identifying entities on a data network such as the Internet.

SUMMARY OF THE INVENTION

COIs, as described in further detail herein, may be applied in a variety of environments ranging from characterizing the online buying behavior of individuals to detecting fraud in telephone networks. Aspects of the present invention describe a system and method for evaluating various aspects of the COIs of hosts within a data network to identify or locate a target entity.

According to one embodiment of the invention, individuals may be tracked or identified based on separating the individual's network communications, which do not contribute to establishing his or her identity, from the user driven communications, which can be used to identify the individual. For example, in the context of online communication, a person does not identify himself by visiting a well-known search engine website such as Google.com because many other people regularly visit the same website. However, the individual would identify himself by visiting an uncommon website dedicated to a particular interest, like sport fishing in the Midwestern United States. The data relating to these sets of network interactions with other nodes or hosts on a data network can be considered a COI.

According to aspects of the invention, an individual can be identified or tracked on a data network by first analyzing the individual's core COI over a period of time. Further, to better understand how an individual's core COI is unique, a joint core COI for a group of individuals over the same period of time is compared to the core COI for the individual or network address of interest. By comparing the information in the core COI with the information in the joint core COI, it is possible to compute a subset of information that is specific to the individual or network address of interest. That is, information that exists in both the core COI and the joint core COI is not specific to, and does not help to identify, the individual or network address of interest, and thus can be eliminated. According to one embodiment of the invention, this subset of information is the signature of the target individual.

The method described herein may allow for the identification of an individual who is sending out unwanted mass e-mails known as spam, or an individual who is trying to infect other computers with a virus or worm. A common way to get around the exclusion of certain spam e-mails is to send the e-mails under different names or e-mail addresses. Instead of looking for the origination of the messages, it is possible to look at with who the spammer is communicating. Knowing this information, i.e. the core COI, could reveal the identity of the spammer.

Another embodiment of the invention allows for a COI profile for known bad actors. Even without knowing the identity of the known bad actors, the COI profile could help identify other bad actors. By comparing the COI profile of the known bad actors to other COI profiles, it is possible to identify additional bad actors.

BRIEF DESCRIPTION OF THE DRAWINGS

The present invention is illustrated by way of example in the following figures and is not limited by the accompanying figures in which.

DETAILED DESCRIPTION OF THE INVENTION

Figure 1:
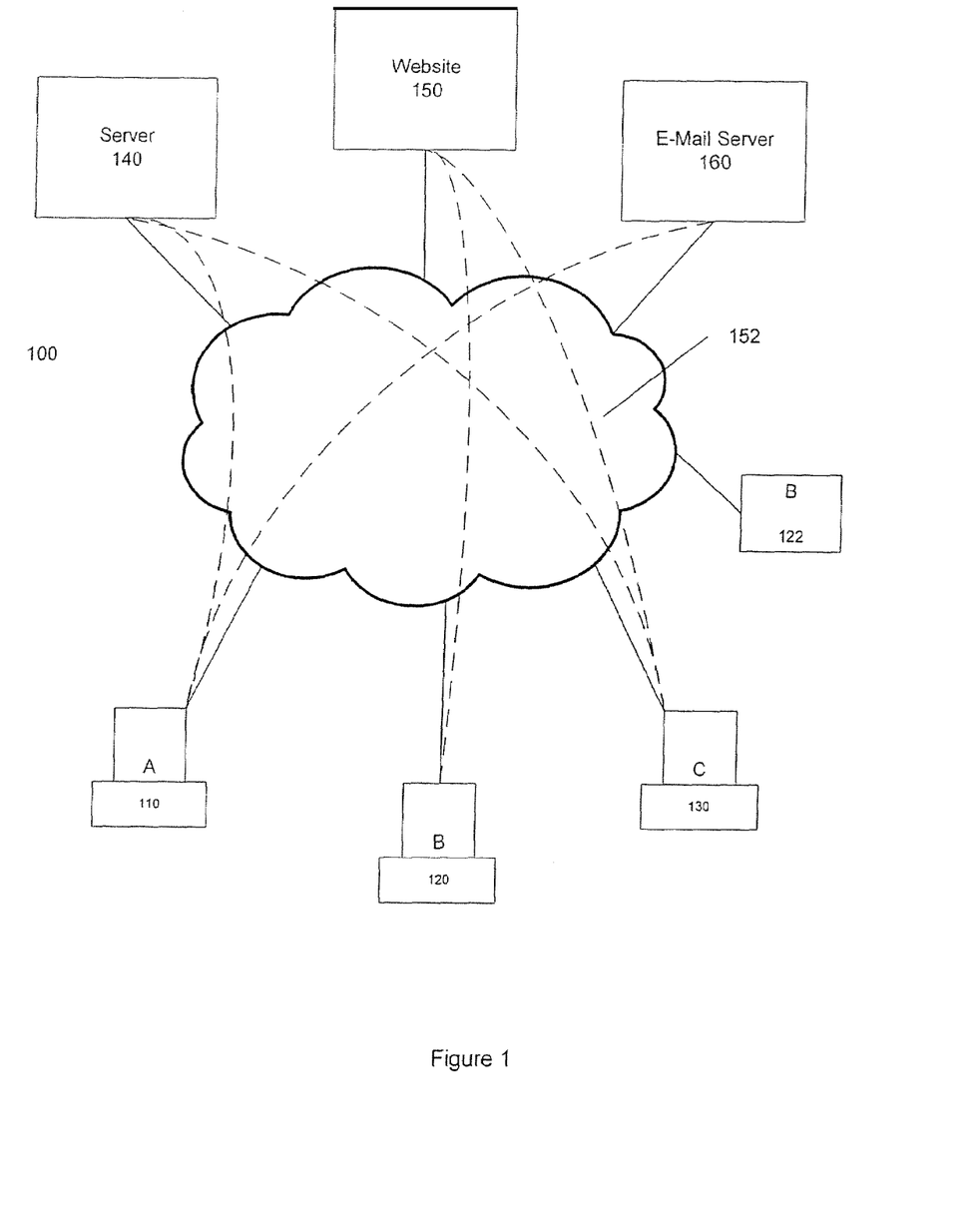
FIG. 1 depicts an example network with different entities creating traffic over the network.

FIG. 1 depicts an example of a data network 100 over which several computers are communicating with a server 140, a website 150 and an e-mail server 160. Ann at computer 110 is communicating with server 140 and e-mail server 160, Bob at computer 120 is communicating with website 150, and Charles at computer 130 is communicating with server 140 and website 150 (see communication path 152). Bob also uses laptop computer 122 when he is not using computer 120.

Figure 2:
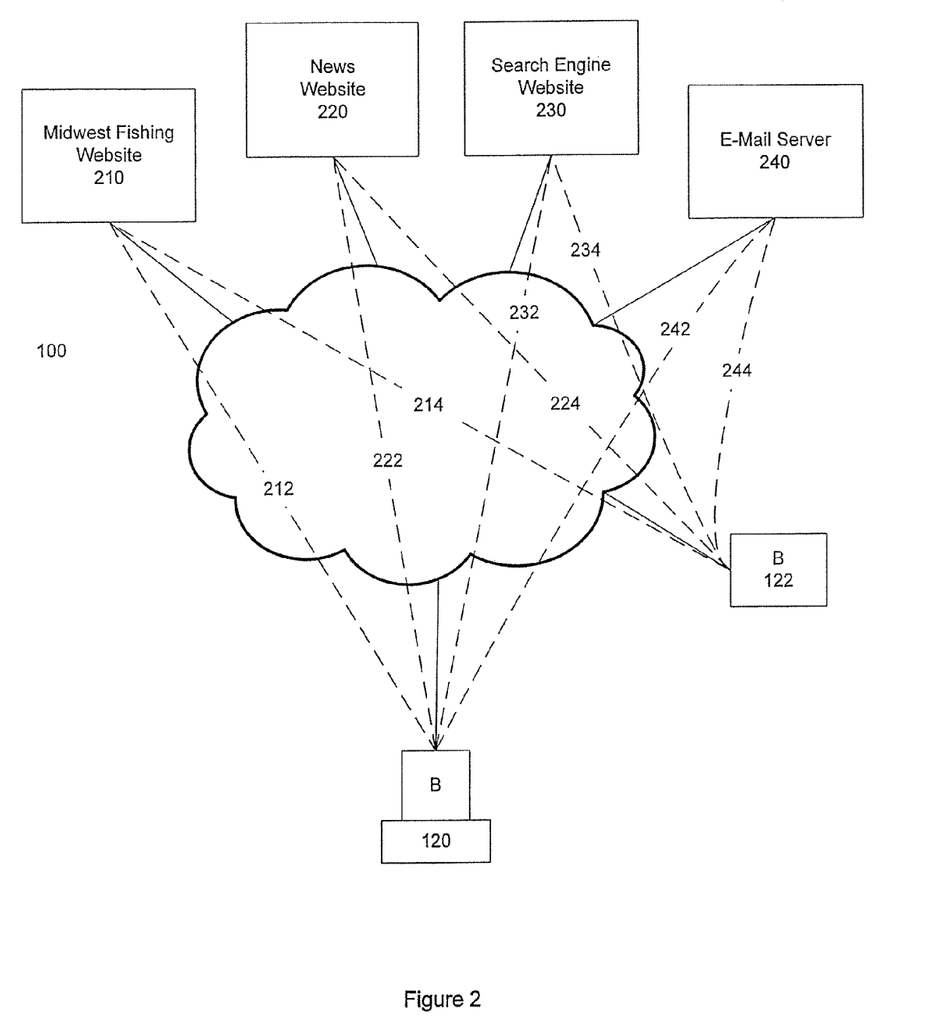
FIG. 2 depicts an example of an individual's network traffic patterns.

Most individuals have a daily pattern of network communication. FIG. 2 is a logical depiction of Bob's exemplary daily network Internet traffic. (Note that some reference numerals from previous figures are carried over). Bob typically visits a news website 220 first thing in the morning and a couple of times throughout the day, 222 and 224, to catch up on current events. Bob uses an Internet search engine 230 for searching related to his job throughout the day, 232 and 234. Bob also sends and receives e-mail throughout the day and thus communicates with his e-mail server 240 throughout the day, 242 and 244. In addition, Bob is an avid fisherman, so he typically visits several websites 210 per day dedicated to fishing in the Midwest United States, 212 and 214. Bob's daily traffic to a common news website and Internet search engine throughout the day are probably not enough to set him apart from other Internet users. However, knowing that Bob visits several sites per day dedicated to sport fishing in the Midwest United States might set him apart from other Internet users.

Figure 3:
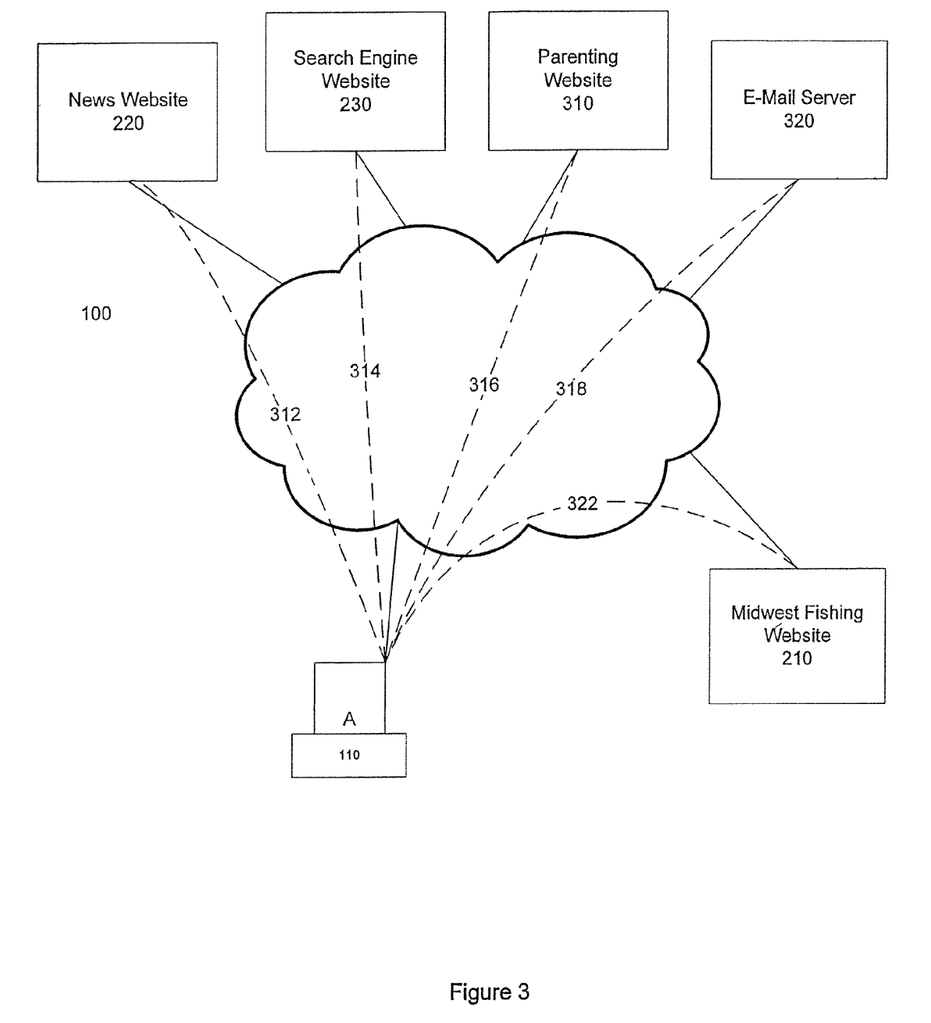
FIG. 3 depicts an example of a second individual's network traffic patterns.

As another example, the network traffic from Ann's computer 110 is depicted in FIG. 3. Like Bob, Ann visits a well-known news website 220 throughout the day, 312, to keep apprised of current events. In addition, Ann also uses a popular Internet search engine 230 regularly for Internet searching, 314, and checks her e-mail throughout the day at e-mail server 320, 318. Ann is also expecting her first child, so she spends quite a bit of time at several sites 310 dedicated to providing information for new parents and related to pregnancy, 316. However, Bob also uses Ann's computer 110 to read about sport fishing in the Midwest, and visits Midwest fishing websites 210, from Ann's computer, 322.

The examples illustrated in FIGS. 2 and 3 demonstrate that it may be difficult to identify an individual solely by a network address such as an IP address. If Ann and Bob change communication providers, or if they use different computers—for example, Bob uses computer 120, computer 122, and Ann's computer 110—their network address will likely change. On different computers, Ann and Bob would likely be entering the Internet at different access points, but their patterns of communication over the Internet would be roughly the same. However, it is possible to analyze the patterns and trends of an individual's network traffic over time, such as Bob's and Ann's network traffic, and identify or locate the individual by comparing the individual's network traffic patterns to the network traffic patterns of others.

According to aspects of the present invention, COIs can be used to track or identify individuals on a data network such as the public Internet. Because an individual's communication pattern remains the same over extended periods of time, i.e. there is some stability to the communication pattern, regardless of how or where they are accessing the Internet or whether or not they are sharing an IP address, by mapping the communication pattern of an individual and comparing the communication pattern of the individual to the communication patterns of others, it is possible to locate or identify the individual.

Figure 4:
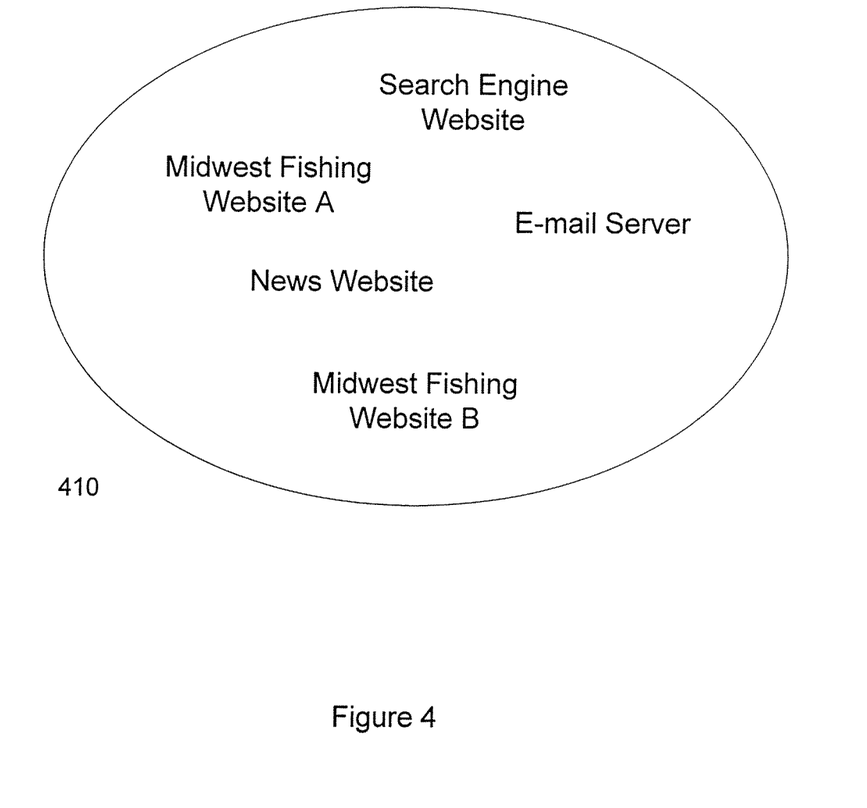
FIG. 4 depicts an example core COI according to an embodiment of the present invention.

In one embodiment of the invention, a COI refers to a collection of interacting hosts in a data network. In the broadest sense, this can mean that the COI for a particular host or node consists of all other network hosts or nodes with which the particular host interacts. Further, as described herein, this particular host may be referred to as a target node or target network address. FIG. 4 depicts an example of the contents of the COI of Bob, or his core COI 410, according to the network communication described in FIG. 2.

Figure 5:
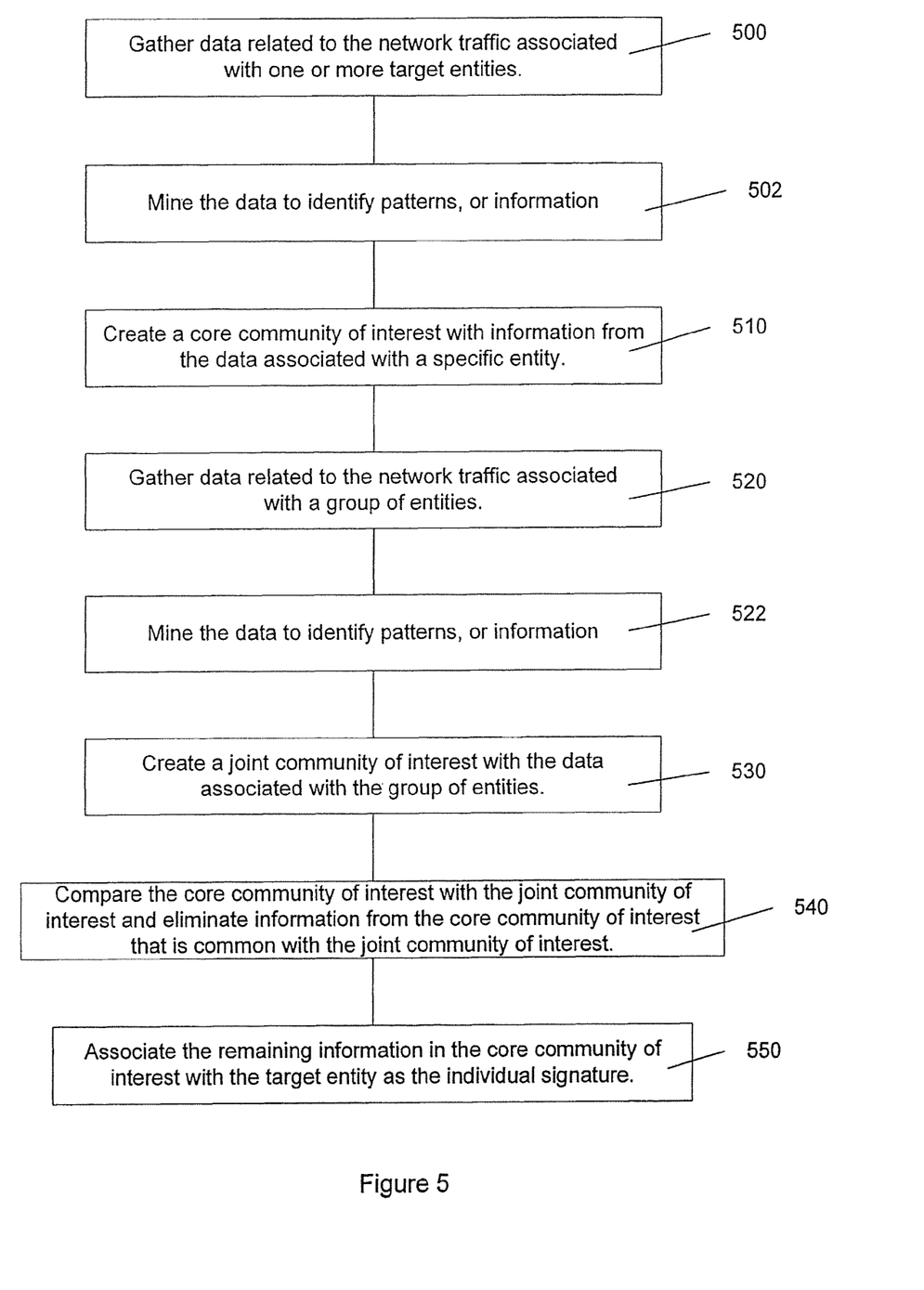
FIG. 5 depicts a flow chart of the steps involved in one embodiment of the method of tracking individuals using COIs according to the present invention.

FIG. 5 is a flow chart of the steps involved in tracking an individual in a data network, according to one embodiment of the invention described herein. At step 500, data related to the network traffic associated with a target entity is gathered over a period of time. In an IP network, flow record data is the network data that is most readily available (as opposed to content based communication). Flow level or flow record data generally refers to the characteristics of a data stream, such as the source IP address, the destination IP address, the source IP port used, the destination IP port used, and the protocol number. Many core networks collect such data on a sample basis, and this data can reveal where the communication initiated. The gathering of flow record data and the analysis thereof is discussed in "Analysis of Communities of Interest in Data Networks" by William Aiello, Charles Kalmanek, Patrick McDaniel, Subhabrata Sen, Oliver Spatscheck and Jacobus Van der Merwe, which is incorporated herein by reference.

Figure 6:
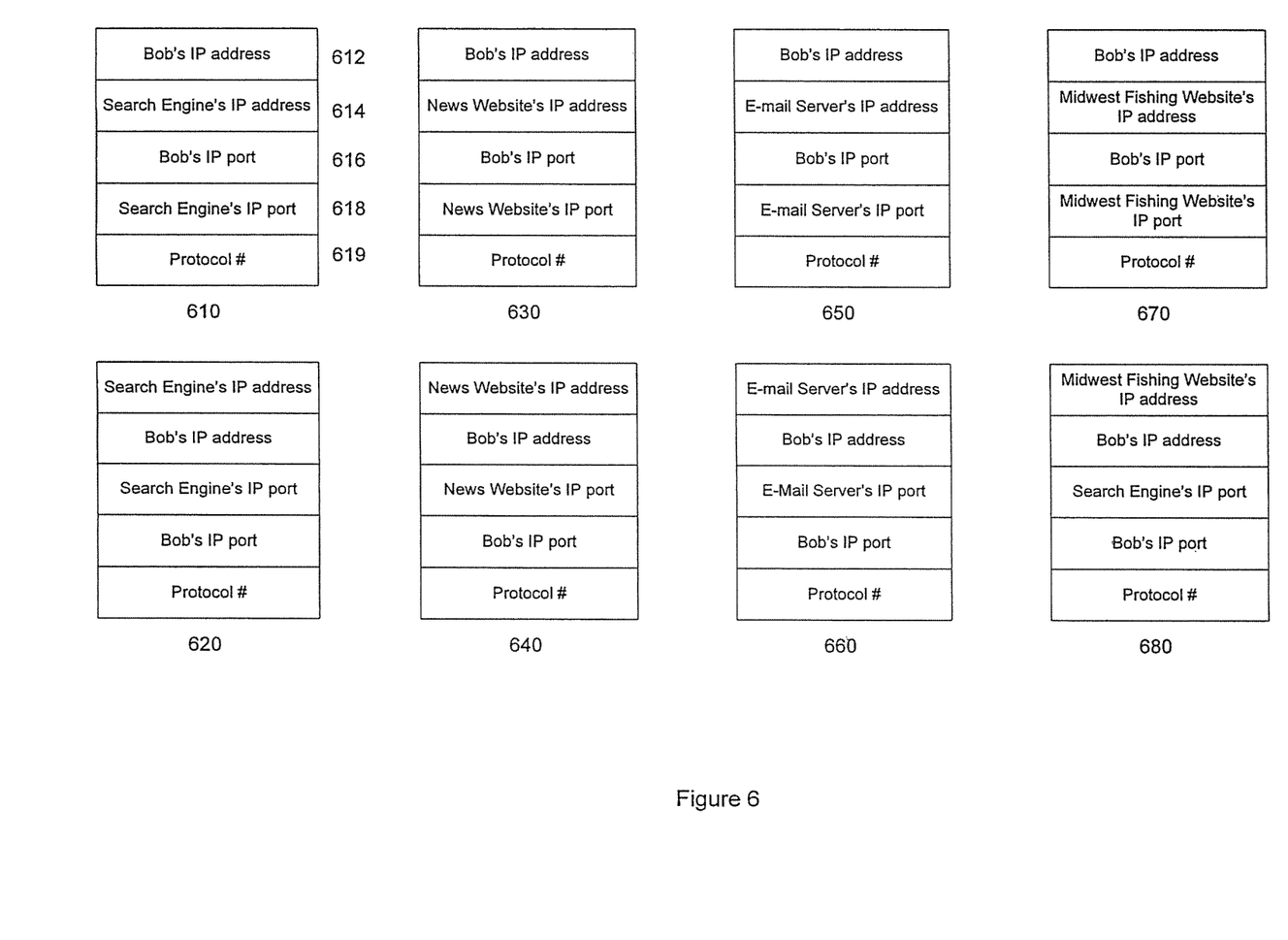
FIG. 6 depicts exemplary data associated with a core COI according to one embodiment of the invention.

FIG. 6 exemplifies flow record data for the simplified COI depicted in FIG. 4. Flow record data related to the network traffic traveling from Bob's computer to the search engine website is shown at 610, and flow record data related to the network traffic traveling from the search engine website is shown at 620. Likewise, at 610 the source IP address 612, the destination IP address 614, the source IP port 616, the destination IP port 618, and the protocol number 619 data are shown. The source IP address data, the destination IP address data, the source IP port data, the destination IP port data, and the protocol number data are shown in the same order at 620. The flow record data is likewise exemplified for the news website at 630 and 640, the e-mail server at 650 and 660, and the Midwest Fishing website at 670 and 680.

Embodiments of the present invention as described are inherently different and larger scale than the counterpart applications in a telephone network. For example, flow record data is typically full of unwanted or unusable data that does not necessarily represent valid communication, such as Internet worm activity or BOT activity. This data must be cleaned from the records before the records can be used. The specific algorithms and techniques for gathering the data are different as well, for the main reason that a typical IP network has many applications.

The present invention also contemplates that other characteristics related to an individual's network communication can be used as the information for compiling the basic COI, such as the frequency of communication, lack of activity, or other specific characteristic that can be gauged from the individual's communications and interactions that would make the individual unique. Thus, the information relevant to building a core COI is not limited to information obtained from flow record data. It is contemplated that other types of data may be gathered and used in practicing the invention described herein, such as any packet-level data.

Referring back to FIG. 5, in step 502, the data that is gathered is then mined to identify patterns of communication that can be used as the information creating a COI. In step 510 a core COI for the specific or target individual to be tracked is created. Again, FIG. 4 depicts a core COI for Bob, as discussed earlier. This core COI is the set of information, such as a set of IP addresses, that is mined from the flow record data reflecting with what network nodes or hosts the individual of interest is communicating. For example, Bob's exemplified core COI includes visiting a news website, an e-mail server, a search engine website and websites related to Midwest fishing. If these were the only communications made by an individual at any time, this information could make up the core COI for the individual. It is further contemplated that the data gathered about an individual's network communication must be further scrutinized to exclude outlying data or one-time hits that may not be indicative of an individual's communication pattern. In analyzing some data networks, especially large-scale data networks, sophisticated algorithms may be necessary to define a COI.

Figure 7:
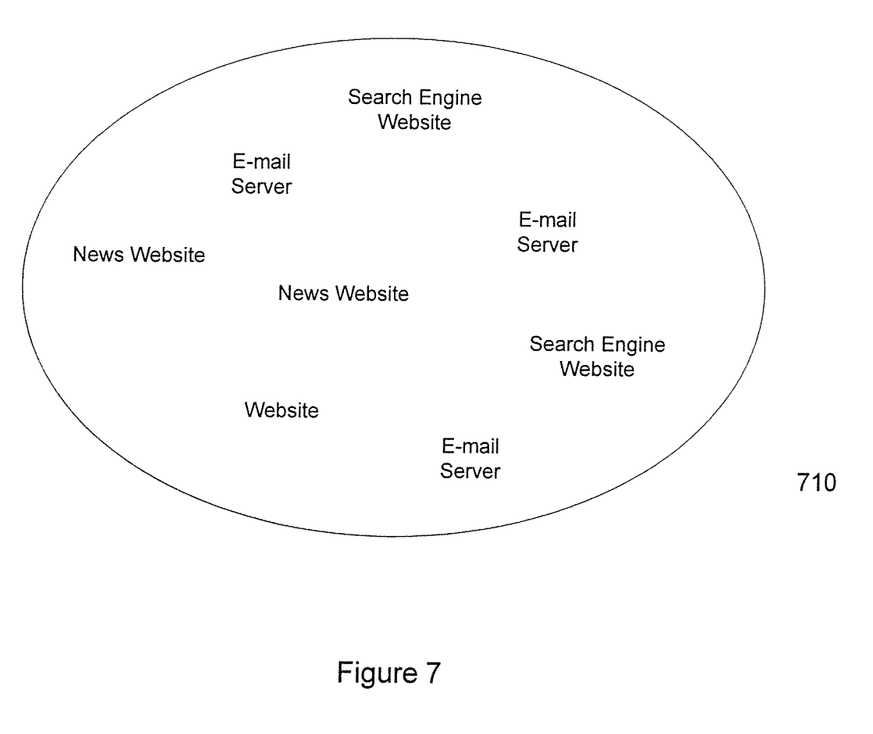
FIG. 7 depicts an example joint COI according to an embodiment of the present invention.

At 520 in FIG. 5, similar data as described above is gathered for a group of entities over a period of time, and in step 522 the data is mined to identify patterns of communication that can be used as the information for creating a COI. This information is used to compute a joint core COI for the group of entities or network addresses at 530. An exemplary joint core COI 710 according to an embodiment of the invention is depicted at FIG. 7. At 710, an exemplary group of hosts is shown which makes up the joint core COI for a group of entities. According to aspects of the invention, the joint core COI 710 is created by intersecting individual core COIs for a group of entities over the same time period that the core COI for the target individual is created. This step involves looking at what is common among all of the individuals in the group.

Figure 8A:
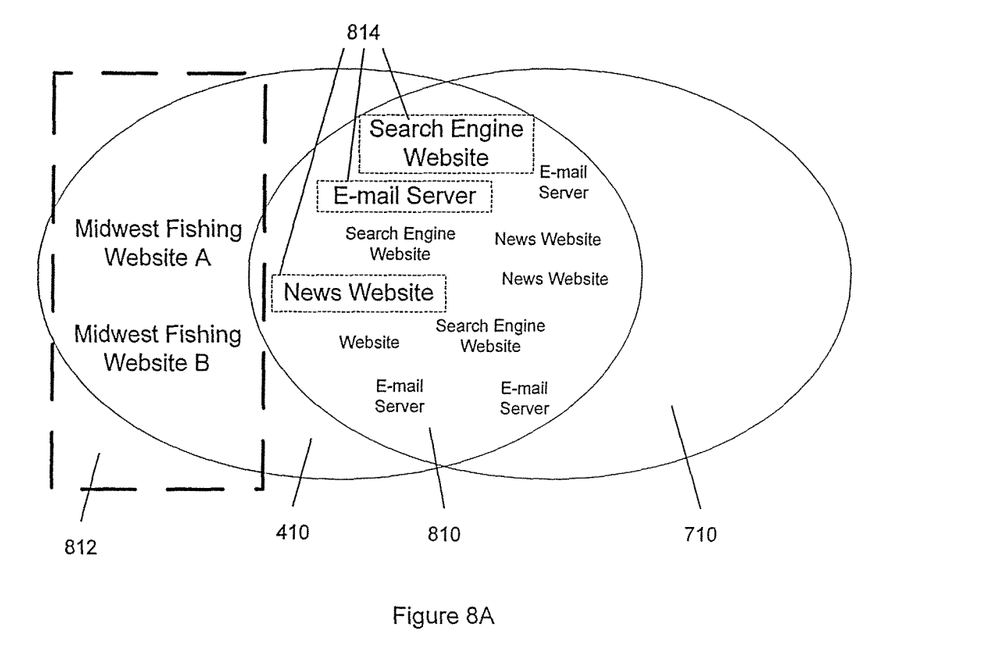
FIG. 8A depicts an example of the intersection of an exemplary core COI and a joint core COI according to one embodiment of the invention.

At step 540 in FIG. 5, the core COI of the target individual is compared against the joint core COI of the representative group, and the common information among the two COIs are excluded from the core COI of the individual. FIG. 8A depicts the intersection of the core COI of FIG. 4, 410, with the joint core COI of FIG. 7, 710. The intersecting group in each COI is depicted in 810, which includes all of the common information among the group and the target individual—the search engine website, the e-mail servers, the news website, and other common websites. The elements 812 and 814 comprise the original core community of interest of the target individual. The elements in box 812, the two Midwest fishing websites (A and B), comprise the information that is particular to the exemplary target individual, for example Bob, as described above. At step 550 in FIG. 5, this information is associated with the target individual as the target individual's signature, and can thus be used to identify or locate the target individual.

Figure 8B:
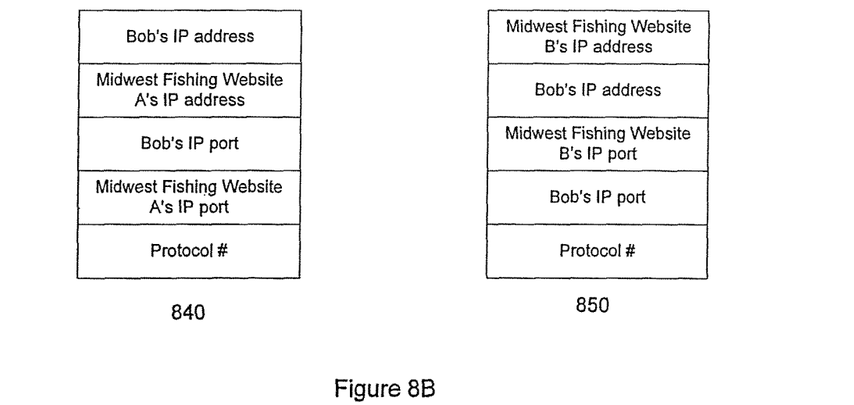
FIG. 8B depicts exemplary information associated with an individual's core COI that is specific to the individual according to one embodiment of the invention.

FIG. 8B depicts the flow record data for the network communication that is particular to the target individual, as used to create the group of elements depicted in 812. For example, flow record data related to the network traffic traveling from Bob's computer to Midwest Fishing Website A is shown at 840. The flow record data related to the network traffic traveling from the Midwest Fishing Website B to Bob's computer is shown at 850.

As discussed earlier, an individual is not identified by knowing that he or she visited a common search engine website, similar to a large number of people who also visited the same search engine website. Instead, an individual is identified by having a traffic pattern that is specific, such as checking a few German news sites (for an individual who is German), or having a particular pattern of online buying (for an individual who is using a stolen credit card). The embodiments described herein allow an individual or network node to be singled out for the unique network traffic created by the individual.

It is feasible to implement the invention described herein on a very large scale, for example to review the COIs for the online community that crosses an Internet Service Provider's backbone network. It is contemplated that in a large scale implementation, creating core COIs for individuals, which is computing-intensive, could be done offline, and online communications could be monitored for matching with, for example, fraudulent actor COI profiles. It is also noted that the invention can be used to monitor any type of data traffic, for instance, the data traffic used to identify an individual could include voice-over-IP data.

It should be noted that the certain aspects of the present invention have been described herein, but the invention is not limited to the embodiments described. For example, the method is not limited to a network carrying IP traffic, but could be implemented on any type of data network, including corporate or Enterprise networks. The following claims demonstrate the breadth of the invention.

We claimed:

1. A computer-implemented method for identifying a target entity in a data network, the method comprising:
   monitoring the target entity to determine a first plurality of hosts with which the target entity communicates over a period of time;
   creating a first core community of interest associated with the target entity, wherein creating the first core community of interest comprises excluding a first host from the first plurality of hosts with which the target entity communicates only once over the period of time such that the first core community of interest comprises second hosts from the first plurality of hosts with which the target entity communicates more than once over the period of time;

monitoring a first entity to determine a second plurality of hosts with which the first entity communicates over the period of time and a second entity to determine a third plurality of hosts with which the second entity communicates over the period of time;

creating a joint community of interest associated with the first entity and the second entity, wherein creating the joint community of interest comprises intersecting a second core community of interest associated with the first entity with a third core community of interest associated with the second entity such that the joint community of interest comprises third hosts which the first entity and the second entity have in common;

comparing the first core community of interest associated with the target entity with the joint community of interest associated with the first entity and the second entity to determine a fourth host which the first core community of interest and the joint community of interest have in common;

excluding the fourth host which the first core community of interest and the joint community of interest have in common from the first core community of interest to create a target community of interest associated with the target entity, the target community of interest comprising a fifth host from the first core community of interest which the target entity and the first and second entities do not have in common; and using the target community of interest to identify the target entity.

2. The method of claim 1, wherein the period of time comprises a particular portion of a day.

3. The method of claim 1, wherein the first core community of interest and the joint community of interest include a data server address, a website address, and an e-mail server address.

4. The method of claim 1, wherein both the first core community of interest and the joint community of interest include a data server address, a website address, and an e-mail server address.

5. The method of claim 1, wherein the first core community of interest and the joint community of interest only include website addresses.

6. The method of claim 1, further comprising:
using the target community of interest to identify the target entity when the target entity uses a plurality of computers over a given period of time, each of the plurality of computers having a distinct network address.

* * * * *